March 6, 1962 — H. A. BABCOCK ETAL — 3,023,624
CONTINUOUS READING DENSIMETER
Filed Dec. 6, 1957 — 2 Sheets-Sheet 1
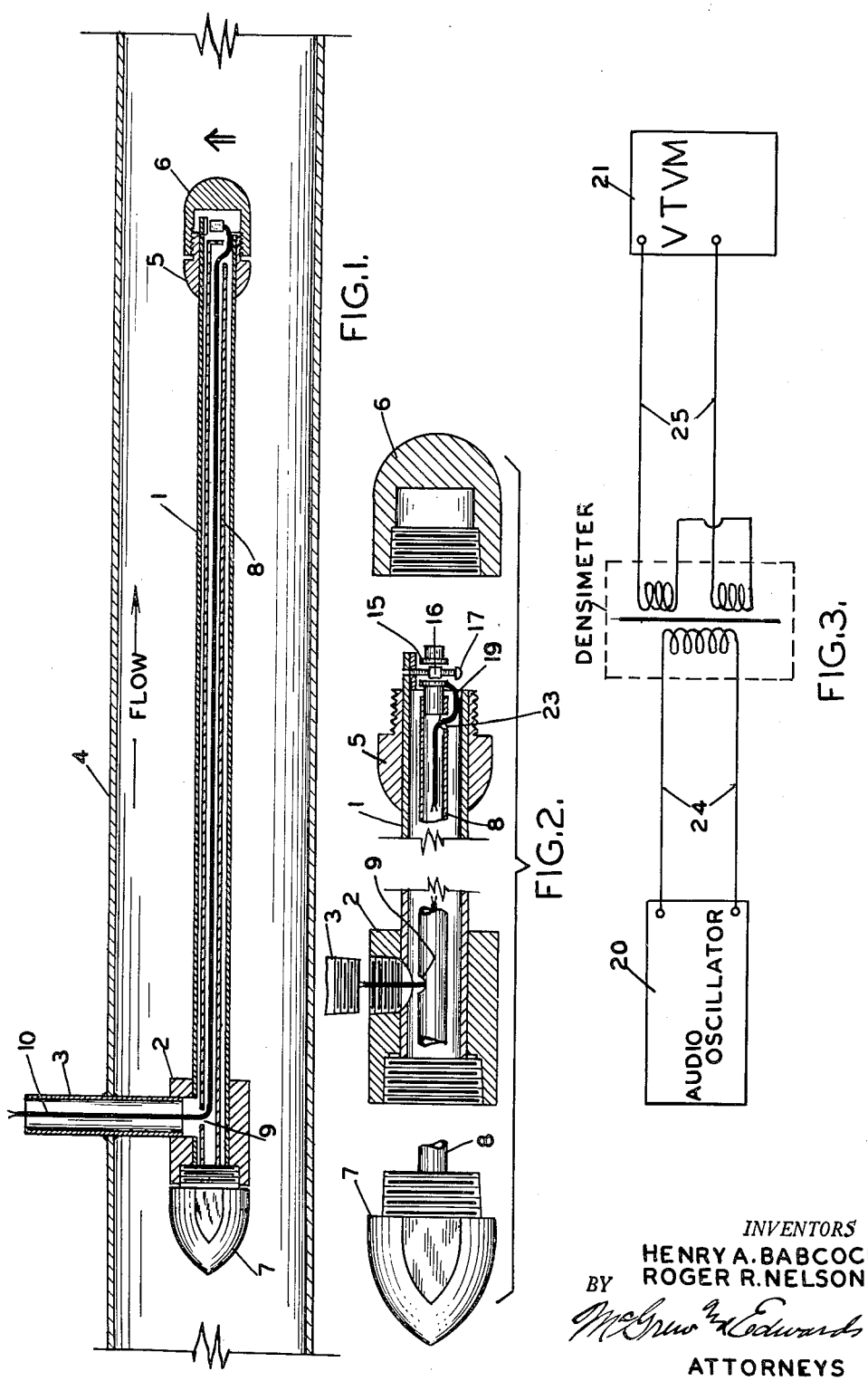
INVENTORS
HENRY A. BABCOCK
ROGER R. NELSON
BY McGrew & Edwards
ATTORNEYS March 6, 1962 H. A. BABCOCK ETAL 3,023,624
CONTINUOUS READING DENSIMETER
Filed Dec. 6, 1957 2 Sheets-Sheet 2
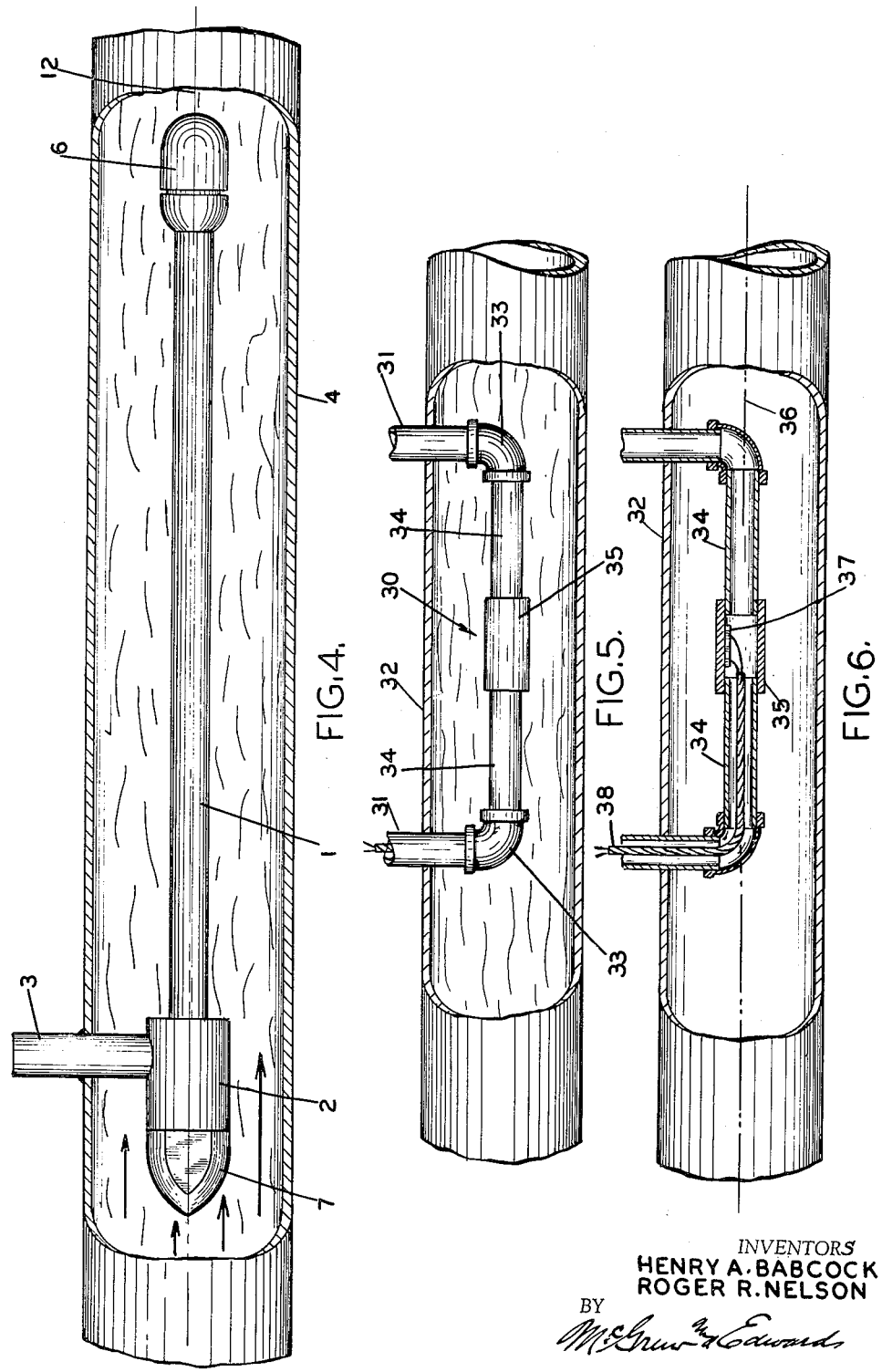
INVENTORS
HENRY A. BABCOCK
ROGER R. NELSON
BY
McGrew & Edwards
ATTORNEYS

United States Patent Office 3,023,624
Patented Mar. 6, 1962

3,023,624
CONTINUOUS READING DENSIMETER
Henry A. Babcock, 423 16th St., Golden, Colo., and Roger R. Nelson, 1509 University Ave., Madison 5, Wis.
Filed Dec. 6, 1957, Ser. No. 701,189
3 Claims. (Cl. 73—453)

This invention relates to continuous reading densimeters, and more particularly it relates to improvements in devices for continuously indicating the density or specific gravity of fluids in a confined zone, whether the fluid is in motion or at rest.

A fluid, which includes liquids, suspensions, pulps, etc., is normally analyzed for specific gravity or density by withdrawing a small sample from a large body of fluid, and the sample measured by various methods, such as a hydrometer, etc. Especially when a suspension is encountered, the separation of a small portion from the body of the fluid does not necessarily mean a representative sample is obtained, and, therefore, it is not satisfactory and accurate specific gravity or density analysis of the mass is generally not obtained. Furthermore, such methods are frequently batchwise or intermittent, that is, no continuous reading of the density is obtained.

According to the present invention, there is provided a continuous reading densimeter which may be immersed into a body of fluid, whether it is at rest or in motion in a conduit, and provide a continuous measurement of the density or specific gravity of the fluid. The invention provides an essentially rigid beam mounted in a substantially horizontal position and completely immersed in the fluid. When mounted in a fluid, the beam is substantially insensitive to pressure changes, and when properly mounted in a conduit, it is insensitive to velocity changes of the fluid. The device may be made very sensitive responding to minute changes in density and providing an accurate measurement of the local specific gravity or density of the fluid surrounding the device.

Included among the objects and advantages of the present invention is a simple and highly efficient constant measuring device for specific gravity or density of fluids. The device provides a rugged measuring instrument which may be placed in moving fluid as well as in stationary fluid, and which provides means for measuring suspensions as well as homogeneous liquids. The device includes a beam immersed in the fluid being measured and buoyancy effect of the fluid on the beam is measured so that a calibrated scale may be provided for translating this buoyant effect into a density or specific gravity reading. The device provides an instrument in which the sensitive measuring mechanism does not come into contact with the fluid, and the beam may be made of a material impervious to the fluid in which it is immersed.

These and other objects and advantages of the invention may be readily ascertained by referring to the following descriptions and appended illustrations in which:

FIGURE 1 is a side elevational view of a device according to the invention shown in cross-section and illustrating its mounting in a conduit;

FIGURE 2 is an exploded side elevational, cross-sectional view of various parts of the device illustrating in detail one modification of the invention;

FIGURE 3 is a schematic wiring diagram of the electrical system for use with a densimeter according to the invention;

FIGURE 4 is a side elevational view illustrating the mounting of a cantilever beam device according to the invention in a conduit of moving fluid;

FIGURE 5 is a side elevation view of a modified densimeter according to the invention mounted in a conduit of flowing fluid; and FIGURE 6 is a cross-sectional detailed view of the modified form of the densimeter of FIGURE 5.

In general, the device of the invention includes an essentially rigid, hollow beam mounted horizontally and completely immersed in a body of fluid. When referring to a rigid beam in this specification, it will be understood that what is meant is merely relative, in that the materials of the beam must be essentially rigid as compared to the fluid in which it is mounted, and it is further understood that the material of the beam has a certain elasticity which permits a minor amount of bending under the buoyant effect of the fluid on the beam. The measurement of the strains on the beam provides means for translating such strains into density or specific gravity readings as will be pointed out below. It will be remembered that when a body is completely immersed in a fluid, the resultant pressure of the fluid acts vertically upward, substantially through the center of gravity of the space left by the displaced fluid, that is, the fluid displaced by the volume of the body immersed in the fluid, and this resultant pressure is a function of the weight of the fluid displaced. This resultant upward force exerted by the fluid on the body is called buoyancy or the force of buoyancy. This force of buoyancy introduces measurable physical effects on the body which may be translated into specific gravity or density through various mechanisms.

In one form of the device illustrated in FIGURES 1, 2 and 3, a cantilever beam, rigidly attached to a mounting, is completely immersed in a body of fluid. Illustrated in FIGURE 1, the body 1 is mounted in a conduit 4 having a flow of fluid therethrough, indicated by the arrow. The beam 1 is a tube secured to a head 2 which is mounted on a lateral tube 3. The connections of all the parts must be liquid tight to prevent the fluid in the conduit from entering the internal portions thereof. The lateral tube 3 may be welded or otherwise secured to the wall to provide a rigid, leak-proof seal. The exposed end of tube 3, beyond conduit 4, is open permitting access to the interior thereof. The outer end of tube 1, which is the end opposite the head 2 has a mount 5 sealed thereon with its threaded end extending beyond the end of the tube 1. A cap 6 is threaded on the end 5 to provide a leak-proof seal, completely enclosing the end of the tube. End 5 and cap 6 together constitute a float. A streamline deflector head 7 is threadedly engaged to the head 2 and provides means for guiding the flowing fluid around the measuring device preventing undue eddys, etc. An internal tube or hollow beam 8 is, likewise, rigidly secured in the head 7, and it is secured in such a manner as to remain substantially stationary or at least stationary in relation to beam 1. A small hole 9, adjacent to tube 3, in the wall of the tube 8 provides an entrance for electric wires 10. As shown in detail in FIGURE 2, the parts are threaded for easy assembly or disassembly, however, they may be attached in any convenient manner such as welding, brazing and the like, so long as a leak-proof device is provided.

As illustrated in FIGURE 4, the cantilever beam or tube 1 is normally mounted on the center line 12 of the conduit 4 so as to minimize the effects of vertical currents which are produced by eddys and the like in the pipe, and to have the device suspended in the center of flowing fluid where there is found the most representative portion of the fluid. Also, under normal conditions, the inside of the hollow tube 1 contains air maintained under atmospheric pressure, but under special conditions, various types of gas or a partial vacuum may be applied to the tube.

As the tube or beam 1 is completely immersed in the liquid, the buoyant effect will tend to force the beam upwardly, indicated by the arrow near the cap 6, and the tendency to deflect upwardly is a function of the specific gravity or density of the liquid. The internal beam 8, is not in contact with the liquid in the conduit 4 and remains substantially stationary so that there is a relative movement between the cantilever beam 1 and the cantilever beam 8. If there is any movement of the head 2 or tube 3, both beams 1 and 8 move conjointly so that the relative movement between them is substantially constant due to the buoyancy effect. Measuring the difference of movement between the two beams provides the means for measuring the specific gravity or density of the fluid in the conduit 4. The measurement of the relative movement may be accomplished in several different ways which may be electrically, mechanically or other well-known means. The measurement device illustrated in detail in FIGURE 2 is a transformer which includes a coil 15 and a core 16 mounted on an adjusting screw 17. The adjusting screw 17 is threaded into the end of the outer beam 1 while the coil 15 is mounted on the inner beam 8. Relative movement of the two beams moves the core 16 in relation to the coil 15. An audio oscillator 20, shown schematically in FIGURE 3, induces a three volt, two thousand cycle current on the input side of the transformer, illustrated as the "Densimeter" in FIGURE 3. The output side of the transformer is connected to a volt meter 21, identified as "VTVM" in FIGURE 3, such circuitry is well known and further detail is believed unnecessary. The movement of the core in the coil of the transformer changes the output of the transformer and, also, changes the reading of the volt meter. Thus the output of the transformer is a function of the relative movement of the beams, which is in return a function of the fluid density so that the volt meter may be calibrated directly to read density or specific gravity. The lead wires 19 from the transformer pass through a hole 23 in the outer end of the inner cantilever beam 8, and through the hole 9 of the inner end and subsequently out through the tube or conduit 3. The lead 19 is a multiple wire lead, and two wires 24, FIGURE 3, extend from the input side of the transformer to the audio oscillator, while two leads 25 from the output side are connected to the volt meter. A Schaevitz transformer provides a satisfactory means of measuring the relative movement of the two cantilever beams, and since the relative movement between the two beams directly effects the reading of the volt meter, the scale of the volt meter may be readily calibrated to read specific gravity or density directly. Other types of devices may be used to measure the relative movement between the two cantilever beams, and such devices may, also, be made for direct density readings.

The beams and supporting portions may be made of a material substantially impervious to the liquid in the conduit and, therefore, corrosive or reactant fluids may be readily measured for density or specific gravity. The beams may be made of various metals, plastics, glass, etc. The device instantaneously responds to changes in specific gravity or density and, therefore, may provide a continuous reading, or recording. When it is mounted in a pipe, the densimeter tests or measures the total flow of fluid rather than a sample withdrawn from the fluid. Variation in horizontal velocity of the flow will not affect the measurement of specific gravity. Since the buoyancy effect is vertical, the cantilever beam should be placed horizontally in a horizontal portion of a conduit to minimize vertical current effects. Due to the leak-proof structure and to the construction of suitable materials, the instrument will function over a wide variety of temperature and other variable conditions. Once established in the pipe the measurement of the specific gravity or density does not rely on alternate disturbance and re-establishment of equilibrium in a sample. Further, since it is based on the relative movement or stress on a beam, it does not rely on a balance or change of balance due to a change in density. In effect the device operates on the basis of elastic resistance of the beam to a change in the weight of the surrounding liquid medium. As in most measuring instruments, it must be calibrated against a known standard, and this is easily accomplished by known procedures.

In the modified form shown in FIGURES 5 and 6 a relative rigid tube or beam, shown generally by numeral 30, is mounted on tubular supports 31 sealed through a conduit wall 32. For simplicity, threaded joints may be used in making the device. In the device illustrated, an L 33 is secured to each of the tubes or nipples 31. The other or free end of the L is pointed toward an opposed L. A nipple 34 is secured to each of the L's 33, and a coupling 35 joins the two nipples 34 to complete the beam. The center line of the nipples 34 and the coupling 35 should coincide with center line 36 of the conduit 32. A strain gage 37, having leads 38 extending outwardly through one of the support tubes 31, is mounted in the pipe or coupling 35. The strain gage is preferably an SR-4 gage made by the Baldwin Lima Hamilton Corp., a well known device. There are other types of strain gages available on the market and are usable if they are sensitive enough to detect very small forces. Such strain gages measure strain as a function of the electric resistance. Strain gages must be very sensitive and should measure a strain on the device on which they are attached with an accuracy of about 0.000001 inch per inch. Thus the unit in a submerged beam will vary with the buoyant force produced on the submerged beam. As pointed above, it is well known that the buoyant force varies with the specific gravity or density of the fluid, and by measuring the strain, which is a function of movement, induced on the beam, the specific gravity or density of the fluid may be measured. In using an SR-4 strain gage, an ohmmeter, such as a strain indicator made by Foxboro Manufacturing Company, may be used. The scale of such meters may be arranged to provide a direct reading by calibrating the indicated strain to specific gravity or density. While the modification has been shown as a double supported beam, it is obvious that the device may utilize a cantilever beam by removing one of the support tubes 31 and completely closing and sealing the end of the tube or beam, similarly to the device in FIGURES 1–4. In either event the strain or movement induced on the beam by the fluid is a direct function of density or specific gravity, and, therefore, the density or specific gravity of the fluid may be readily measured.

While the device has been illustrated with reference to a specific embodiment, there is no intent to limit the spirit or scope of the invention to the precise details so set forth, except in so far as defined in the following claims.

We claim:

1. A continuous reading densimeter for measuring the density of a fluid flowing in a conduit comprising an elongated, hollow, essentially rigid first beam having a relatively thin wall mounted in said conduit and having its longitudinal axis concentric with the center line thereof, said first beam being rigidly secured at one end in a head portion, a lateral support extending from said head portion through the wall of said conduit, mounting said head portion in a rigid horizontal position, a closure on the other end of said first beam enclosing the end thereof in fluid tight relation, a second beam rigidly mounted in said head and extending internally to and substantially concentric with said first beam and out of fluid contact whereby the buoyant force of the liquid causes a relative movement between said two beams, and means internal of said beam for measuring the relative movement of said two beams.

2. A device according to claim 1 in which the means for measuring the relative movement of said beams includes a transformer coil secured to one said beam and a transformer core secured to the other said beam whereby the output of an impressed current on said transformer provides a measure of the movement of said beams.

3. A continuous reading densimeter which comprises a hollow, elongated, essentially rigid beam having a relatively thin wall mounted in and completely submerged under the surface of a body of fluid, support means for rigidly mounting one end of said beam whereby said beam extends horizontally in said fluid, means for maintaining said beam fluid tight and the interior thereof under gas pressure, a second beam rigidly mounted on said support means internally of said beam and extending to a point adjacent the other end thereof out of liquid contact, strain measuring means including means mounted at the other end of said beam for measuring movement between said two beams, said strain measuring means mounted internally of said beam at substantially the point of maximum movement thereof due to the buoyant force of the fluid in which it is submerged, and means extending from said measuring means through said support means for measuring the strain induced in said beam.

References Cited in the file of this patent

UNITED STATES PATENTS

| | | |
|---|---|---|
| 2,460,503 | Howe | Feb. 1, 1949 |
| 2,592,569 | Henderson | Apr. 15, 1952 |
| 2,607,214 | Schlueter | Aug. 19, 1952 |
| 2,688,868 | Elkins | Sept. 14, 1954 |